(12) United States Patent
Jiang et al.

(10) Patent No.: US 9,602,469 B2
(45) Date of Patent: *Mar. 21, 2017

(54) METHOD AND APPARATUS FOR OPTIMIZING HYPERTEXT TRANSFER PROTOCOL ("HTTP") UNIFORM RESOURCE LOCATOR ("URL") FILTERING SERVICE

(71) Applicant: A 10 Networks, Inc., San Jose, CA (US)

(72) Inventors: Xuyang Jiang, Saratoga, CA (US); Takaaki Ishii, San Jose, CA (US); Masataka Noro, Saitama (JP)

(73) Assignee: A 10 NETWORKS, INCORPORATED, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/964,207

(22) Filed: Dec. 9, 2015

(65) Prior Publication Data
US 2016/0087943 A1    Mar. 24, 2016

Related U.S. Application Data

(63) Continuation of application No. 14/065,963, filed on Oct. 29, 2013, now Pat. No. 9,231,915.

(51) Int. Cl.
*H04L 29/06* (2006.01)
*G06F 17/30* (2006.01)
*H04L 29/08* (2006.01)

(52) U.S. Cl.
CPC .... *H04L 63/0281* (2013.01); *G06F 17/30887* (2013.01); *G06F 17/30896* (2013.01);
(Continued)

(58) Field of Classification Search
CPC .................................................. H04L 63/0281
See application file for complete search history.

(56) References Cited

U.S. PATENT DOCUMENTS 6,137,777 A * 10/2000 Vaid .................... H04L 1/1854
370/230
6,269,403 B1    7/2001 Anders
(Continued)

FOREIGN PATENT DOCUMENTS

JP    2012208941    10/2012
WO    2005069823    8/2005

OTHER PUBLICATIONS

Liberatore, Marc, and Brian Neil Levine. "Inferring the source of encrypted HTTP connections." Proceedings of the 13th ACM conference on Computer and communications security. ACM, 2006.*

(Continued)

*Primary Examiner* — Shawnchoy Rahman

(57) ABSTRACT

A method for handling hyper-text transfer protocol ("HTTP") requests from client devices is disclosed. The method comprises receiving an HTTP request from a client device to connect to a destination server. It further comprises extracting a plurality of HTTP headers from the HTTP request using a gateway device in accordance with a user defined configuration to create a subset of the request. Next, it comprises forwarding the subset to an external security device from the gateway device to perform URL policy processing using the request. Finally, it comprises based on a received result of the URL policy processing, transmitting the client request to the destination server.

26 Claims, 15 Drawing Sheets

(52) U.S. Cl.
CPC ...... *H04L 63/0245* (2013.01); *H04L 63/0254* (2013.01); *H04L 63/0263* (2013.01); *H04L 63/08* (2013.01); *H04L 63/105* (2013.01); *H04L 63/168* (2013.01); *H04L 63/20* (2013.01); *H04L 67/02* (2013.01); *H04L 67/42* (2013.01)

(56) References Cited

U.S. PATENT DOCUMENTS

| | | | | |
|---|---|---|---|---|
| 7,487,508 | B2* | 2/2009 | Fu | H04L 29/06 709/220 |
| 7,774,484 | B1* | 8/2010 | Masters | H04L 47/125 709/223 |
| 8,375,127 | B1 | 2/2013 | Lita | |
| 9,213,850 | B2* | 12/2015 | Barton | G06F 21/604 |
| 9,231,915 | B2 | 1/2016 | Jiang et al. | |
| 2006/0288220 | A1 | 12/2006 | Pennington et al. | |
| 2008/0281983 | A1* | 11/2008 | Cooley | H04L 63/145 709/245 |
| 2010/0192212 | A1* | 7/2010 | Raleigh | G06Q 10/06375 726/7 |
| 2010/0265824 | A1 | 10/2010 | Chao et al. | |
| 2010/0293385 | A1* | 11/2010 | Nanda | H04L 63/166 713/176 |
| 2011/0035437 | A1 | 2/2011 | Toumura | |
| 2011/0072144 | A1 | 3/2011 | Fikouras et al. | |
| 2012/0204236 | A1* | 8/2012 | Chen | H04W 12/06 726/4 |
| 2013/0007239 | A1* | 1/2013 | Agarwal | H04L 63/02 709/223 |
| 2016/0248795 | A1* | 8/2016 | Chien | H04L 63/101 |

OTHER PUBLICATIONS

Sakurada, Reiko, Takaaki Moriya and Junichi Akahani; "Extracting User Posting Behavior Using HTTP Flow" Information and Telecommunication Technologies (APSITT), 2010 8TH Asia-Pacific Symposium On. IEEE, 2010.

* cited by examiner

1200

1202 GET / HTTP/1.1
1204 Host: www.yahoo.com
1206 User-Agent: Mozilla/5.0 (Windows NT 6.1; WOW64; rv:23.0) Gecko/20100101 Firefox/23.0
1208 Accept: text/html,application/xhtml+xml,application/xml;q=0.9,*/*;q=0.8
1210 Accept-Language: en-US,en;q=0.5
Accept-Encoding: gzip, deflate
1212 Cookie: B=8ng2gh191n2uk&b=4&d=V6DXEhRpYEK9t6v2WEQvgG7zMQ.DsOw4j18myw--
&s=cb&l=ZEPX6et979AU6hk.w92f;
fpc=d=74wVdf2c_zeHdlVZGUewYFHPe9pObRTK-rULlNTqLgOMgsurv9kRUmyhlJpLTp8QsoqwXEIH8Oz
p8T5y1hgpJAPmyupQYx8FabbmuNoXjUPEya7jgNd46CyUB5Ysr8lqaHCKW2mZNz8Dl4UGNkvTm_qR
HJXZ28UBnNaMWC72C3fgXGqCS1ul4NmgZCwVBX9WjCvw2xSqORjyr2vUMJ14jVaD65965zyjojqP
3dx1Dh.R2vo273jRn3RoJzAlDh_gCaMElsZ.vBxYOoDXw___GN50LTD8hjgbXLvLNrvji71nXxNnlhJMBX
Z4bpOg--&v=2; ywadp100018063654 79=ZWrbw1df|GPE1cGjNaa|fses10001806365479=|v9CyuohNaa|ZWrbw1df|f
fpc100018063654 79=ZWrbw1df|GPE1cGjNaa|fses10001806365479=|v9CyuohNaa|ZWrbw1df|f
vis100018063654 79=|8MHooM1MYM|8MHooM1MYM|8MHooM1MYM|0|8MHooM1MYM|8M
HooM1MYM; fpms=p_13872472=%78%22ca%22%3Anull%7D; ucs=bnas=0;
F=a=BVXnPB0MvTZldjzSditWEYOIWWMpjGel7Zz.4t.ncid72p9ipT7JhD1pdhtMVLp52ZqnuXY-
&b=Hrvd; YLS=v=1&p=0&n=9;
Y=v=1&n=4kdkf0qthmsbf&l=nof980d6/o&p=m252ssu0120000000&r=af&lg=en-US&intl=us;
T=z=v/THSBvT7LSBjHhn7m1ivm1NjUyMwY2NjcONDY1NTdP&a=YAE&sk=DAAleigB2uU5I4&ks=EAA6
320_a9VvKdq6RdUOislag--
"E&d=c2wBTVRJMU5BRXhNVEF6TXpFeU1qQTQBYQFZQJUBZwFaSjQ3QziyWU51VElEV1Y3T1plWE
E1M1Q2VQFzYZlkATZTeDE3R2ZTVnFzYWh3WjE5MGJpNHNOVzY2cyOBb2sBWIcwLQF0aXABTV9kM
GICAXp6AXYvVEhTQkE3RQFhYwFBTEjyZ2hzVwFzYwF3bA--; AO=o=0;
PH=fn=_C9kgF.YVbpCXxbdETlG&l=en-US&i=us;
U=mt=i4vcVp2MhYj21hffRxLxb5HL6sf5oEahKOml8QHUr&ux=jt1LSB&un=4kdkf0qthmsbf;
fpps=_page=%7B%22bypassUserLocPref%22%3A1%7D; FBISC=1378835299;
fpl=d=brtOklLRed2X7OmIGqPLbVR4rq4VTA47a6MT.HxRAdyKvshaddORIK6U5uHtdtOjInGt2qGmT2F
vAcn1YoMrW49gkqxS_8V94jpYloCx8okih7wb&v=1; ypcdb=3de2b70874710df7cc38d6d0431bf8ff;
HP=1
Connection: keep-alive

FIG. 12

METHOD AND APPARATUS FOR OPTIMIZING HYPERTEXT TRANSFER PROTOCOL ("HTTP") UNIFORM RESOURCE LOCATOR ("URL") FILTERING SERVICE

CROSS-REFERENCE TO RELATED APPLICATIONS

The present application is a continuation of U.S. patent application Ser. No. 14/065,963, filed Oct. 29, 2013, entitled "METHOD AND APPARATUS FOR OPTIMIZING HYPERTEXT TRANSFER PROTOCOL ("HTTP") UNIFORM RESOURCE LOCATOR ("URL") FILTERING SERVICE," naming Xuyang Jiang, Takaaki Ishii, and Masataka Noro as inventors, and having, which is herein incorporated by reference in its entirety.

FIELD OF THE INVENTION

Embodiments according to the present invention generally relate to information retrieval in a computer network and more particularly to optimizing policy processing for information retrieval in a computer network.

BACKGROUND OF THE INVENTION

In the World Wide Web ("WWW") environment, client machines effect transactions to Web servers using the Hypertext Transfer Protocol ("HTTP"), which is a known application protocol providing users access to files (e.g., graphics, images, etc.) using a standard page description language known as Hypertext Markup Language ("HTML"). In the WWW paradigm, a network path to a server is identified by a Uniform Resource Locator ("URL") having a special syntax for defining a network connection. Use of an HTML-compatible browser (e.g., Safari) at a client machine involves specification of a link via the URL. In response, the client makes a request to the server identified in the link and, in return, receives a document from the server or other object formatted according to HTML.

Many websites need to enforce some kind of policy regarding client requests for security purposes. The most commonly used policy by almost every internet service provider is URL filtering policy. The URL filtering policy allows users to access only the set of web resources that they have authorization to access.

At many popular Web sites, the capacity demand is much greater than can be served by one server. Accordingly a switch device or a gateway security device may be employed to distribute requests across a pool of servers or on to the network.

FIG. 1 is a diagram of a switch module engaged in a conventional policy enforcement such as URL filtering service behavior. A client device 105 sends a HTTP request, for example, to a switch device 110. Switch device 110 can also have load balancer functionalities to better perform policy enforcement, e.g., AX Series Server Load Balancers manufactured by A10 Networks. However, it should be noted that switch device 110 is not necessarily limited to a load balancer and can be any type of gateway security device. A conventional switch device 110 will forward the entire request to an external device, e.g., proxy servers 172, which will then authenticate the client and the URL by looking information up in URL database 174. External devices can also comprise transparent proxy servers, non-transparent proxy servers, proxy appliances, and combinations thereof. If the client is allowed to access the URL, then the connection will typically be allowed and the traffic from the client will be forwarded through network 150 to destination servers 115. Similarly, if the connection is allowed, then destination servers 115 are allowed to communicate via network 150 to client device 105 as well.

Typically, a "session" is established between the client 105 and servers 115, wherein the session represents a set of connection-less transactions between the client and the destination server. For example, if the destination server is a credit card company Web site, the session involves a set of queries to the server from the client 105, together with the responses served from the servers 115.

FIG. 2 is a diagram of a conventional switch device successfully connecting a client device to a destination server based on authorization received from an external device. Once the request from client 105 is authorized by external device, e.g., proxy servers 172, as discussed above, the switch device can establish a connection between the client 105 and the destination servers 115 through network 150.

FIG. 3 is a diagram of a conventional switch device denying a client device request to a destination server based on a denial received from an external device. If the URL requested by client device 105 is not authorized by external device, e.g., proxy servers 172, then the connection is denied by switch device 110 and the client device is not connected to external servers 115. This is typically referred to as a "403 response case."

FIG. 4 is a diagram of a conventional switch device denying a client request to a destination server as a result of not receiving a response from an external device in the requisite timeframe. In some cases, the external device, e.g., proxy servers 172 may not respond to a client request in time. Accordingly, the switch device 110 will flag a time-out condition and deny the request to client 105.

FIG. 5 is a diagram of a conventional switch device failing to connect to an external device. For example, the external device may be down and not responding. In this case, the switch device 110 fails to connect to external device, e.g., proxy servers 172. Accordingly, the client 105 fails to connect to destination servers 115.

FIG. 6 is a diagram of a conventional switch device not being able to process incoming requests because a request rate limit has been reached. Client devices 605 and 606 are limited in the number of requests that can be transmitted to the switch device 610 and processed by the external devices, e.g. proxy servers 672 in a given period of time. This feature ascertains that the processing capability of the proxy servers is not overburdened. If the client devices cross over that threshold, then a request rate limit is reached and the requests are denied.

FIG. 7 is a diagram illustrating how a connection match is created between the connection from the client device to the switch device and the connection from the switch device to the external device. As discussed before, a session 744 is initiated when a request is sent from client device 105 to switch device 110. Information regarding the initiated session is stored in a session table. When the switch device 110 forwards the request to the external device, e.g., proxy servers 172, another session 748 is created between the client device 110 and the external device. Information regarding this session is also stored in the session table. The two sessions are correlated with each other in the session table by including pointers to each other in the respective data structures. Accordingly, the original session ID can be matched with the external service session ID.

Typically, URL-based policies are always enforced for web traffic. For large organizations such as Internet Service Providers ("ISPs"), the policy enforcement is complicated and is usually based on either the client IP address or user information. The policy enforcement thus requires a significant amount of processing power. Because the gateway device 110 in conventional network topologies does not do any of the policy processing, it needs to be done in an external device, e.g., proxy servers 172.

As a result, in conventional deployment scenarios, the gateway device 110 forwards an entire copy of the original request to the external devices, e.g., servers 172 and enforces the policy based on the response from the external devices. However, most of the content in the requests forwarded over by the gateway device are not used for policy processing in the external device. This results in inefficiencies within the network. First, parsing through all the requests from client devices to filter out the necessary content puts an undue processing burden on the external device. Second, transmitting the entire request, most of which will not be used by the external device creates occupies needless bandwidth in the network. As a result many external devices are required to perform this additional processing at added costs.

BRIEF SUMMARY OF THE INVENTION

Accordingly, a need exists for a method and apparatus that can optimize HTTP URL service by configuring the gateway device to extract only the information required by the external device for policy processing from requests transmitted by the client devices and to transmit that reduced set of information to the external device in the form of HTTP headers and corresponding values. This advantageously allows the switch device or gateway security device to perform much of the processing that would otherwise be performed by the external device. Further, it frees up network bandwidth because only the requisite information, e.g., the destination IP address needed for policy processing is transmitted to the proxy servers. Embodiments of the present invention thereby reduce the number of external devices that are required to perform authentication and policy enforcement.

In one embodiment, a method for handling hyper-text transfer protocol ("HTTP") requests from client devices is disclosed. The method comprises receiving an HTTP request from a client device to connect to a destination server. It further comprises extracting a plurality of HTTP headers from the HTTP request using a gateway device in accordance with a user defined configuration to create a subset of the request. Next, it comprises forwarding the subset to an external security device from the gateway device to perform Uniform Resource Locator ("URL") policy processing using the request. Finally, it comprises based on a received result of the authentication and policy processing, transmitting the client request to the destination server.

In another embodiment, a computer-readable storage medium having stored thereon instructions that, if executed by a computer system cause the computer system to perform a method for handling HTTP requests from client devices is disclosed. The method comprises receiving an HTTP request from a client device to connect to a destination server. It further comprises extracting a plurality of HTTP headers from the HTTP request using a gateway device in accordance with a user defined configuration to create a subset of the request. Next, it comprises forwarding the subset to an external security device from the gateway device to perform URL policy processing using the request. Finally, it comprises based on a received result of the URL policy processing, transmitting the client request to the destination server.

In a different embodiment, an apparatus for handling HTTP requests from client devices is disclosed. The apparatus comprises a memory a processor communicatively coupled to the memory, wherein the processor is configured to parse HTTP requests, and further wherein the processor is configured to: (a) receive an HTTP request from a client device to connect to a destination server; (b) extract a plurality of HTTP headers from the HTTP request using a gateway device in accordance with a user defined configuration to create a subset of the request; (c) forward the subset to an external security device from the gateway device to perform URL policy processing using the request; and (d) based on a received result of the URL policy processing, transmit the client request to the destination server.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

FIG. 12 is an example of a client request that is transmitted to an external device for policy processing by a conventional gateway device.

DETAILED DESCRIPTION OF THE INVENTION

Figure 1:
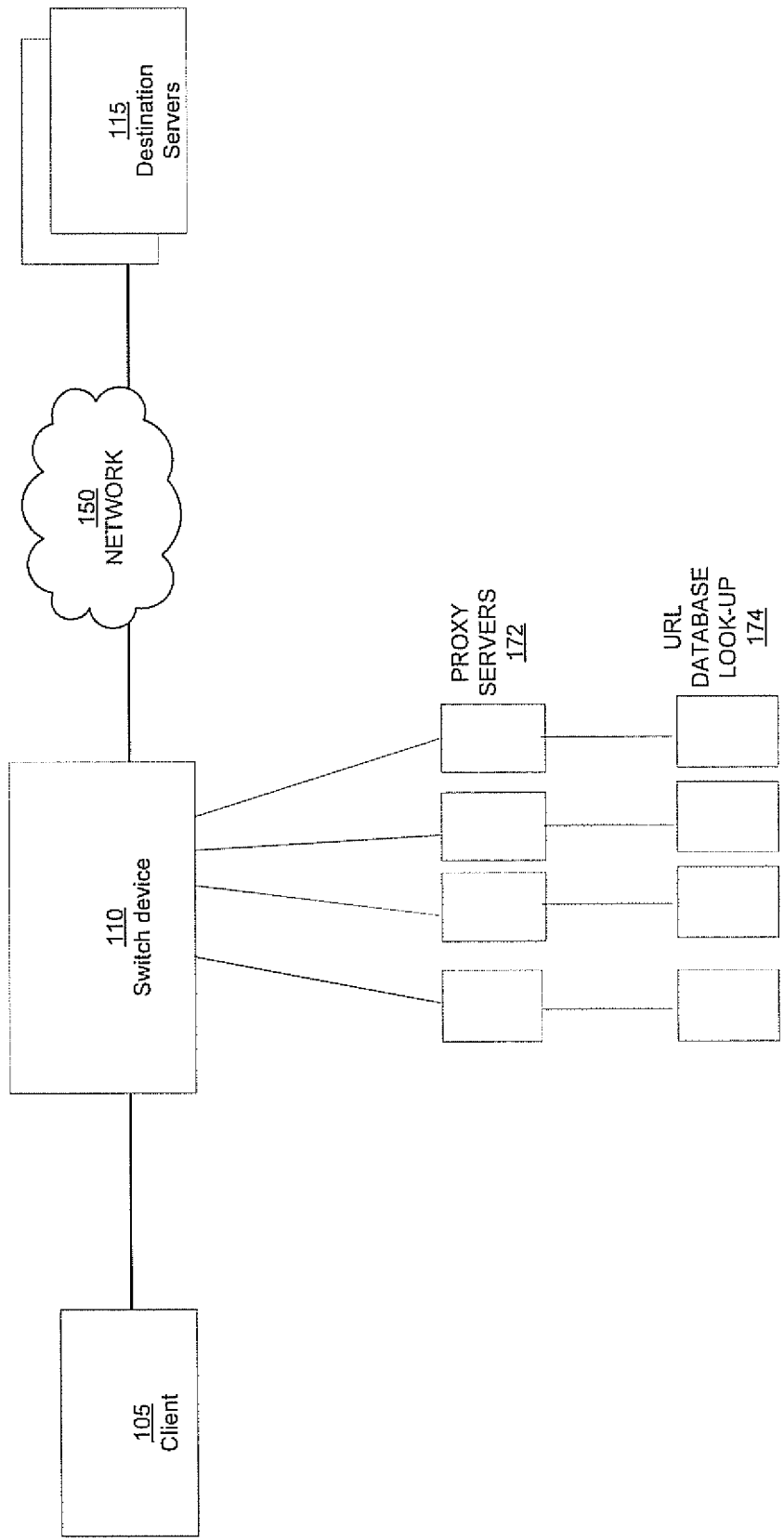
FIG. 1 is a diagram of a switch module engaged in a conventional policy enforcement such as URL filtering service behavior.
Figure 2:
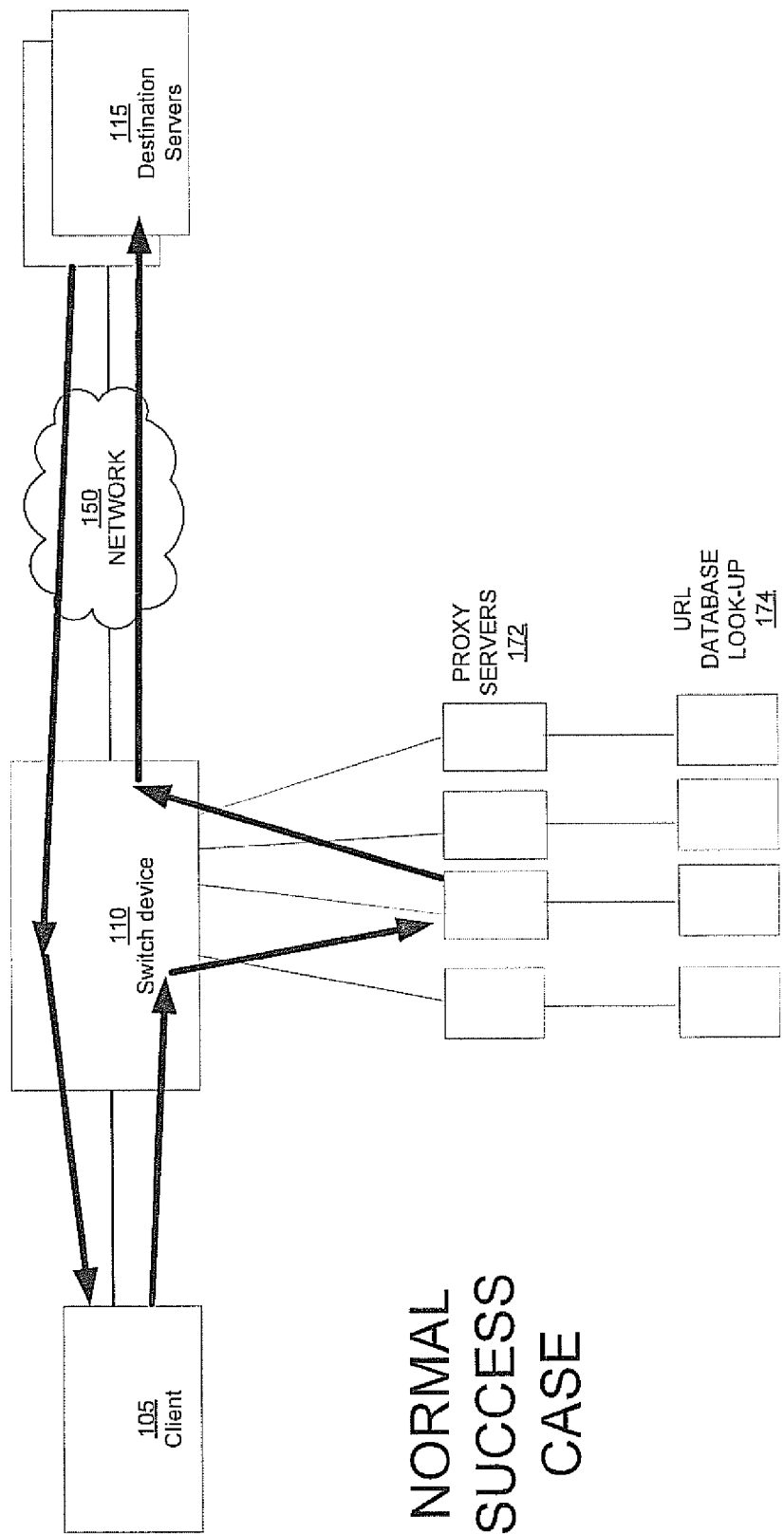
FIG. 2 is a diagram of a conventional switch device successfully connecting a client device to a destination server based on authorization received from an external device.
Figure 3:
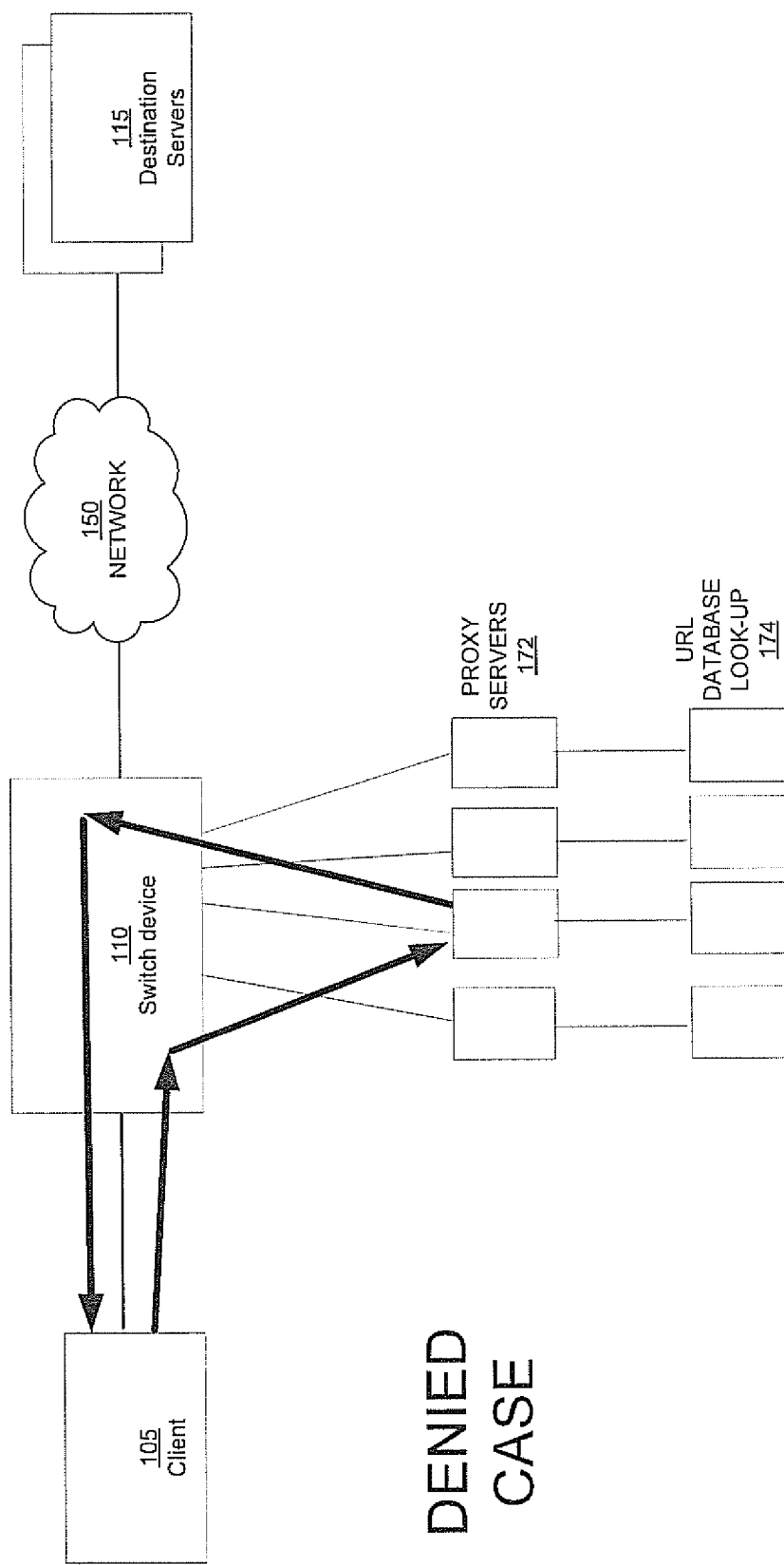
FIG. 3 is a diagram of a conventional switch device denying a client device connection request to a destination server based on a denial received from an external device.
Figure 4:
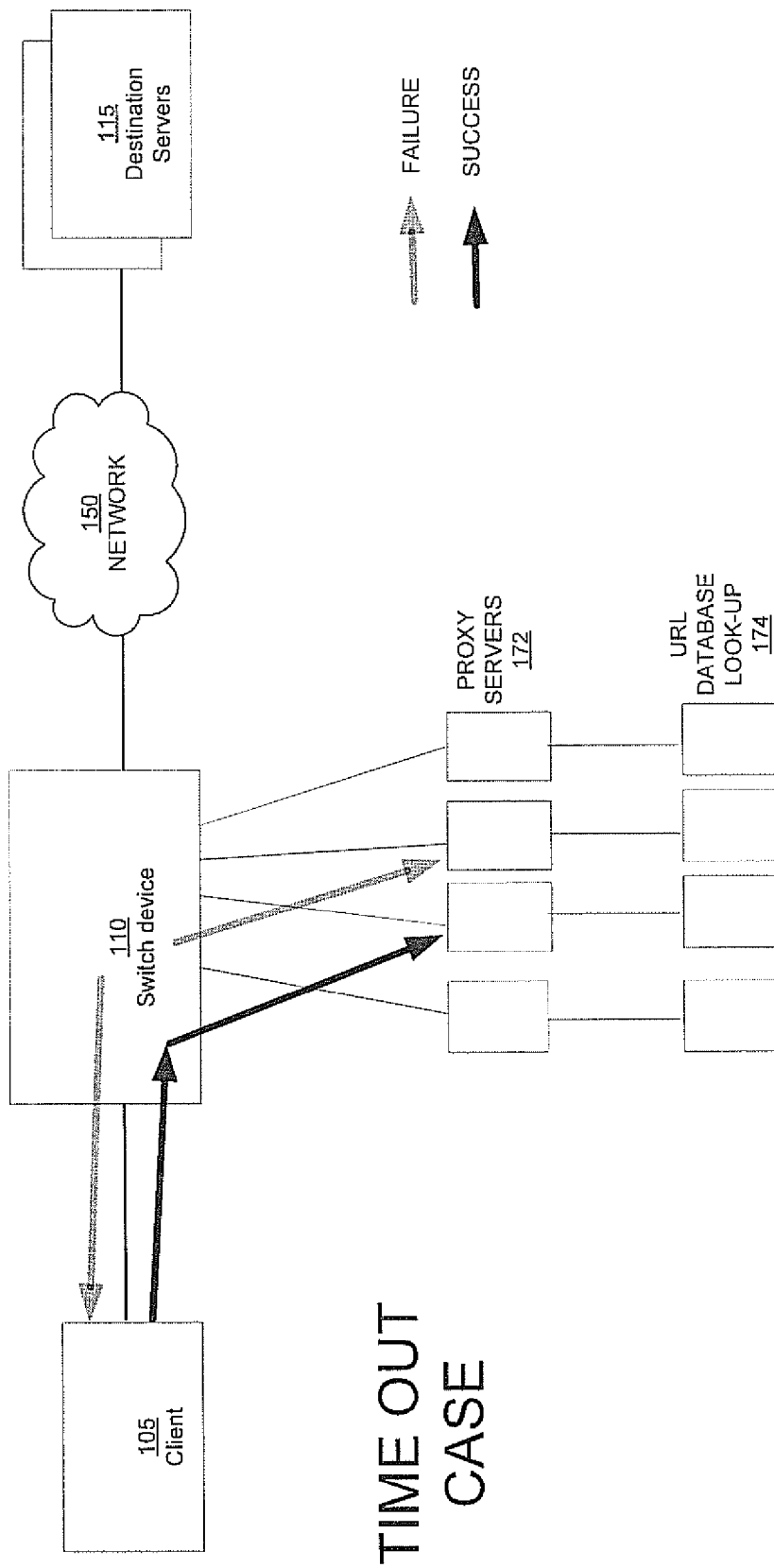
FIG. 4 is a diagram of a conventional switch device denying a client device connection request to a destination server as a result of not receiving a response from an external device in the requisite timeframe.
Figure 5:
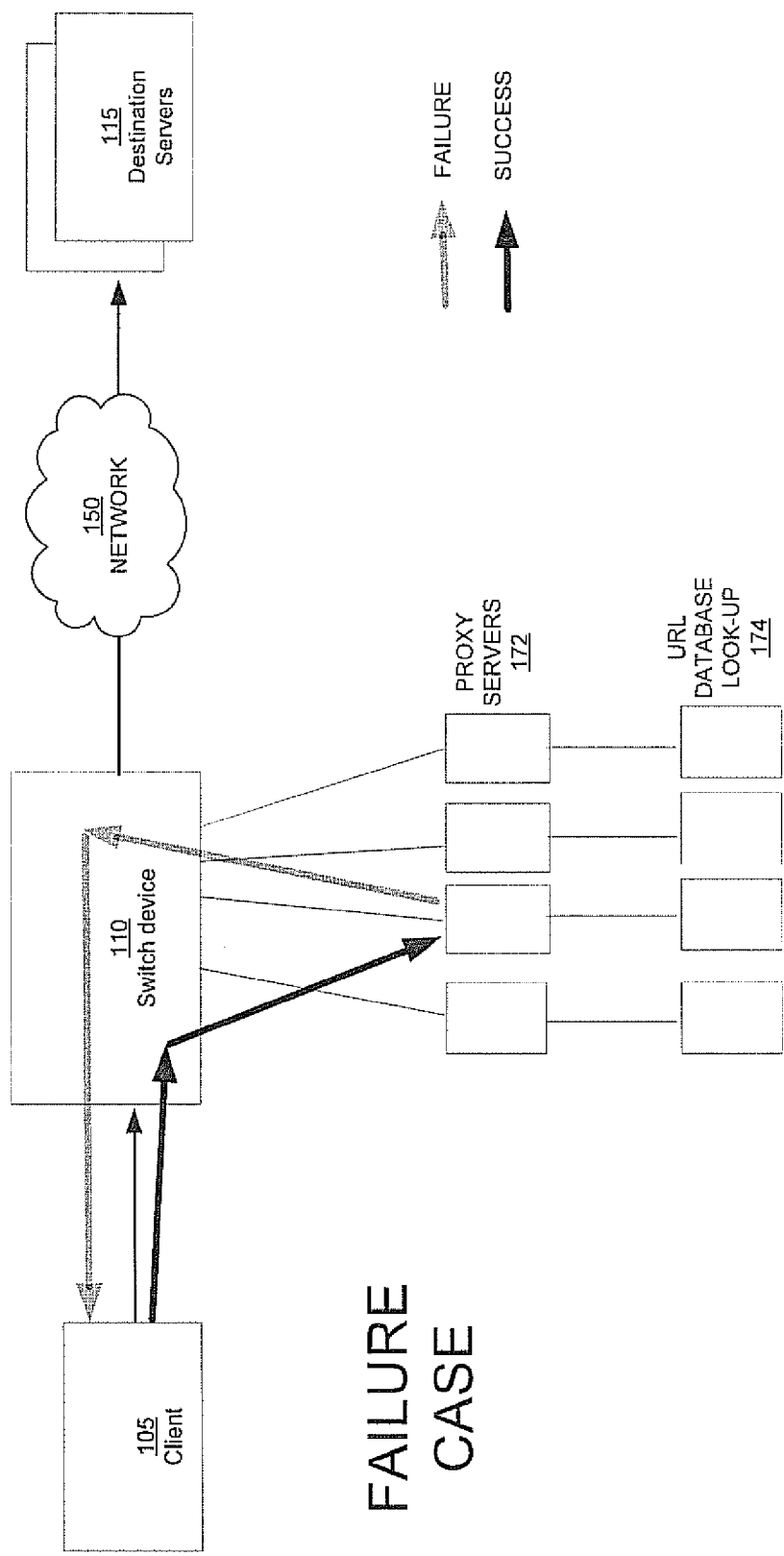
FIG. 5 is a diagram of a conventional switch device failing to connect to an external device.
Figure 6:
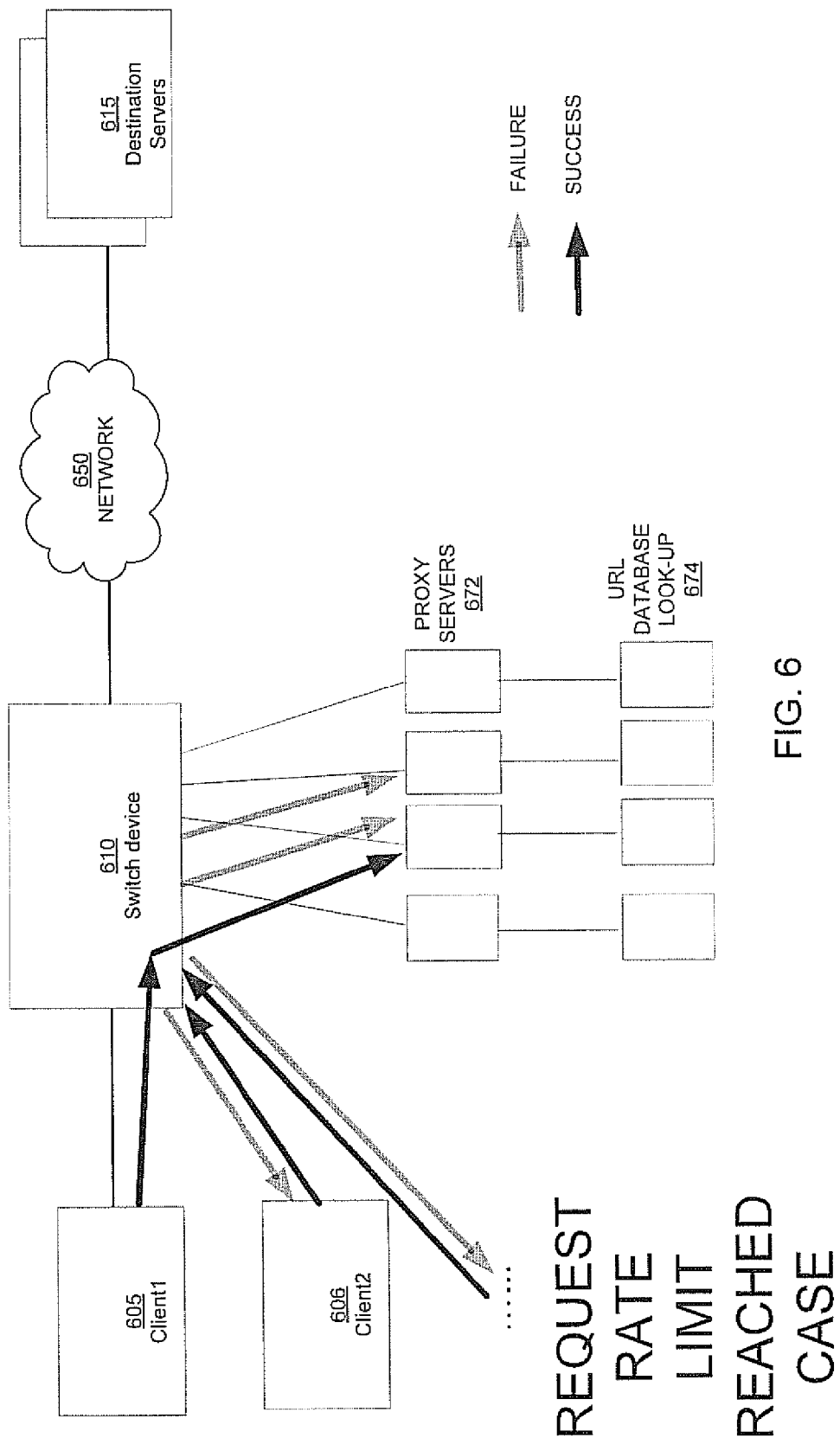
FIG. 6 is a diagram of a conventional switch device not being able to process incoming requests because a request rate limit has been reached.
Figure 7:
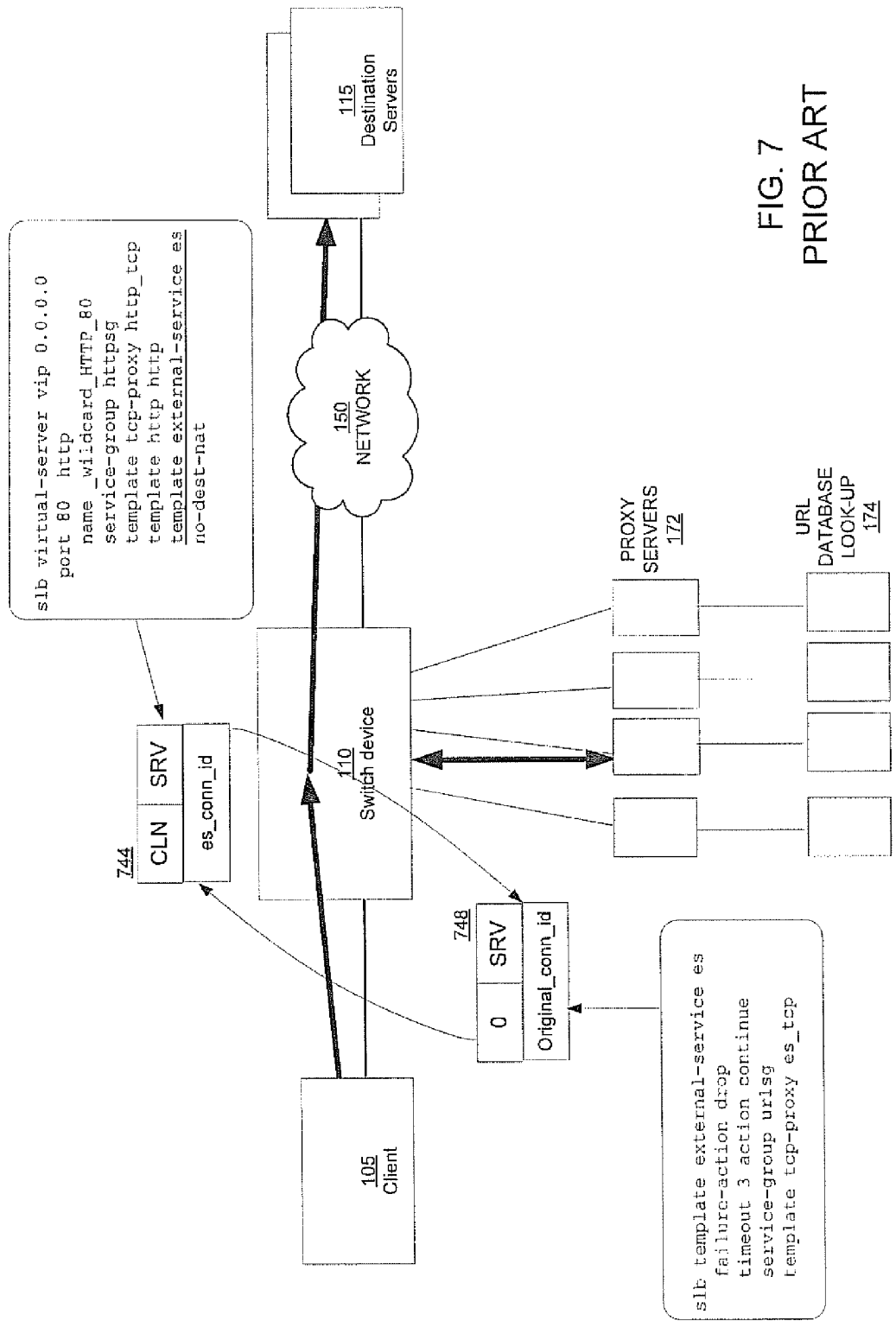
FIG. 7 is a diagram illustrating how a connection match is created between the connection from the client device to the switch device and the connection from the switch device to the external device.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "extracting," "forwarding," "determining," or the like, refer to actions and processes (e.g., flowchart 1000 of FIG. 10) of a computer system or similar electronic computing device or processor (e.g., system 810 of FIG. 8). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Figure 8:
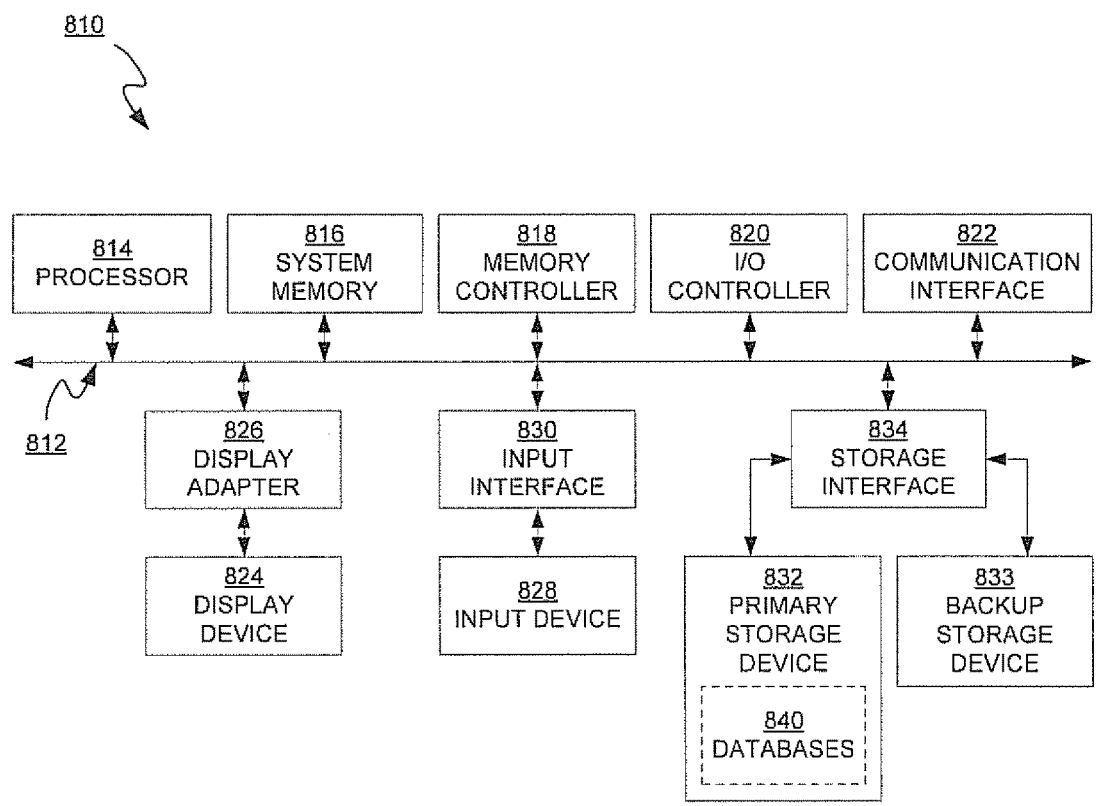
FIG. 8 is a block diagram of an example of a client-side computing system or a destination-side computing system 810 in accordance with embodiments of the present invention.

FIG. 8 is a block diagram of an example of a client-side computing system or a destination-side computing system 810 in accordance with embodiments of the present invention. Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 of an embodiment of the present invention and a system memory 816.

Processor 814 incorporates embodiments of the present invention and generally represents any type or form of processing unit capable of processing data or interpreting and executing instructions. In certain embodiments, processor 814 may receive instructions from a software application or module. These instructions may cause processor 814 to perform the functions of one or more of the example embodiments described and/or illustrated herein.

System memory 816 generally represents any type or form of volatile or non-volatile storage device or medium capable of storing data and/or other computer-readable instructions. Examples of system memory 816 include, without limitation, RAM, ROM, flash memory, or any other suitable memory device. Although not required, in certain embodiments computing system 810 may include both a volatile memory unit (such as, for example, system memory 816) and a non-volatile storage device (such as, for example, primary storage device 832).

Computing system 810 may also include one or more components or elements in addition to processor 814 and system memory 816. For example, in the embodiment of FIG. 8, computing system 810 includes a memory controller 818, an input/output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between example computing system 810 and one or more additional devices. For example, communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In one embodiment, communication interface 822 provides a direct connection to a remote server via a direct link to a network, such as the Internet. Communication interface 822 may also indirectly provide such a connection through any other suitable connection.

Communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data for display on display device 824.

As illustrated in FIG. 8, computing system 810 may also include at least one input device 828 coupled to communication infrastructure 812 via an input interface 830. Input device 828 generally represents any type or form of input device capable of providing input, either computer- or human-generated, to computing system 810. Examples of input device 828 include, without limitation, a keyboard, a pointing device, a speech recognition device, or any other input device.

As illustrated in FIG. 8, computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 810.

In one example, databases 840 may be stored in primary storage device 832. Databases 840 may represent portions of a single database or computing device or it may represent multiple databases or computing devices. For example, databases 840 may represent (be stored on) a portion of computing system 810. Alternatively, databases 840 may represent (be stored on) one or more physically separate devices capable of being accessed by a computing device, such as computing system 810.

Continuing with reference to FIG. 8, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be separate devices accessed through other interface systems.

Many other devices or subsystems may be connected to computing system 810. Conversely, all of the components and devices illustrated in FIG. 8 need not be present to practice the embodiments described herein. The devices and subsystems referenced above may also be interconnected in different ways from that shown in FIG. 8. Computing system 810 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 810. All or a portion of the computer program stored on the computer-readable medium may then be stored in system memory 816 and/or various portions of storage devices 832 and 833. When executed by processor 818, a computer program loaded into computing system 810 may cause processor 814 to perform and/or be a means for performing the functions of the example embodiments described and/or illustrated herein. Additionally or alternatively, the example embodiments described and/or illustrated herein may be implemented in firmware and/or hardware.

Figure 9:
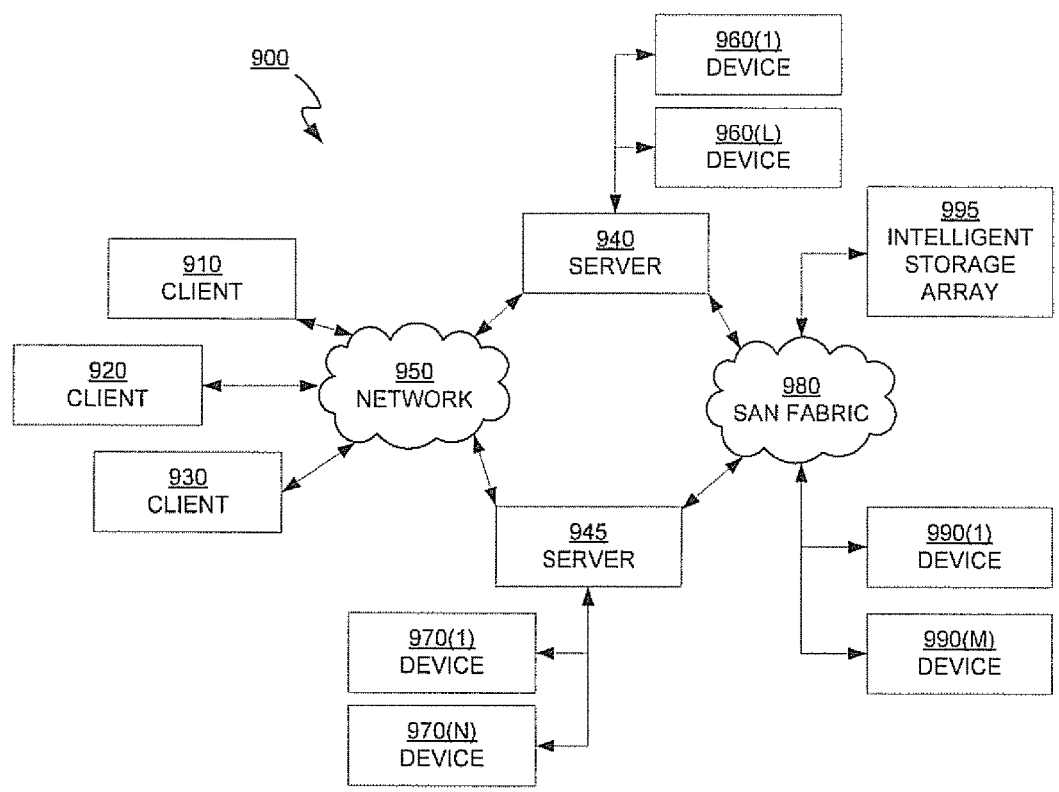
FIG. 9 is a block diagram of an example of a network architecture in which servers and client systems may be coupled to a network, according to embodiments of the present invention.

FIG. 9 is a block diagram of an example of a network architecture 900 in which client systems 910, 920, and 930 and servers 940 and 945 may be coupled to a network 950. Client systems 910, 920, and 930 generally represent any type or form of computing device or system, such as computing system 810 of FIG. 8.

Similarly, servers 940 and 945 generally represent computing devices or systems, such as application servers or database servers, configured to provide various database services and/or run certain software applications. Network 950 generally represents any telecommunication or computer network including, for example, an intranet, a wide area network (WAN), a local area network (LAN), a personal area network (PAN), or the Internet.

With reference to computing system 810 of FIG. 8, a communication interface, such as communication interface 822, may be used to provide connectivity between each client system 910, 920, and 930 and network 950. Client systems 910, 920, and 930 may be able to access information on server 940 or 945 using, for example, a Web browser or other client software. Such software may allow client systems 910, 920, and 930 to access data hosted by server 940, server 945, storage devices 960(1)-(L), storage devices 970(1)-(N), storage devices 990(1)-(M), or intelligent storage array 995.

In one embodiment, all or a portion of one or more of the example embodiments disclosed herein are encoded as a computer program and loaded onto and executed by a switch device connected between servers 940 or 945 and client systems 910, 920, and 930.

Method and Apparatus for Optimizing Hypertext Transfer Protocol ("HTTP") Uniform Resource Locator ("URL") Filtering Service Embodiments of the present invention provide a method and apparatus that can optimize HTTP URL service by configuring a gateway device, e.g., switch device 110 to extract a subset of the original client request including the information required by the external device, e.g., proxy servers 172 for policy processing from requests transmitted by the client devices and to transmit that subset of information to the external device in the form of HTTP headers and corresponding values. This advantageously allows the switch device to perform much of the processing that would otherwise be performed by the external device and thereby reduce the work load of the external device. For example, using embodiments of the present invention, less than half the number of proxy servers 172 would be required to do policy processing in comparison to conventional solutions because the switch device handles much of the processing load that the proxy servers formerly handled.

Further, embodiments of the present invention free up network bandwidth because the requisite information, e.g., the destination IP address needed for policy processing is transmitted to the proxy servers, while the entire client request need not be transmitted.

Figure 10:
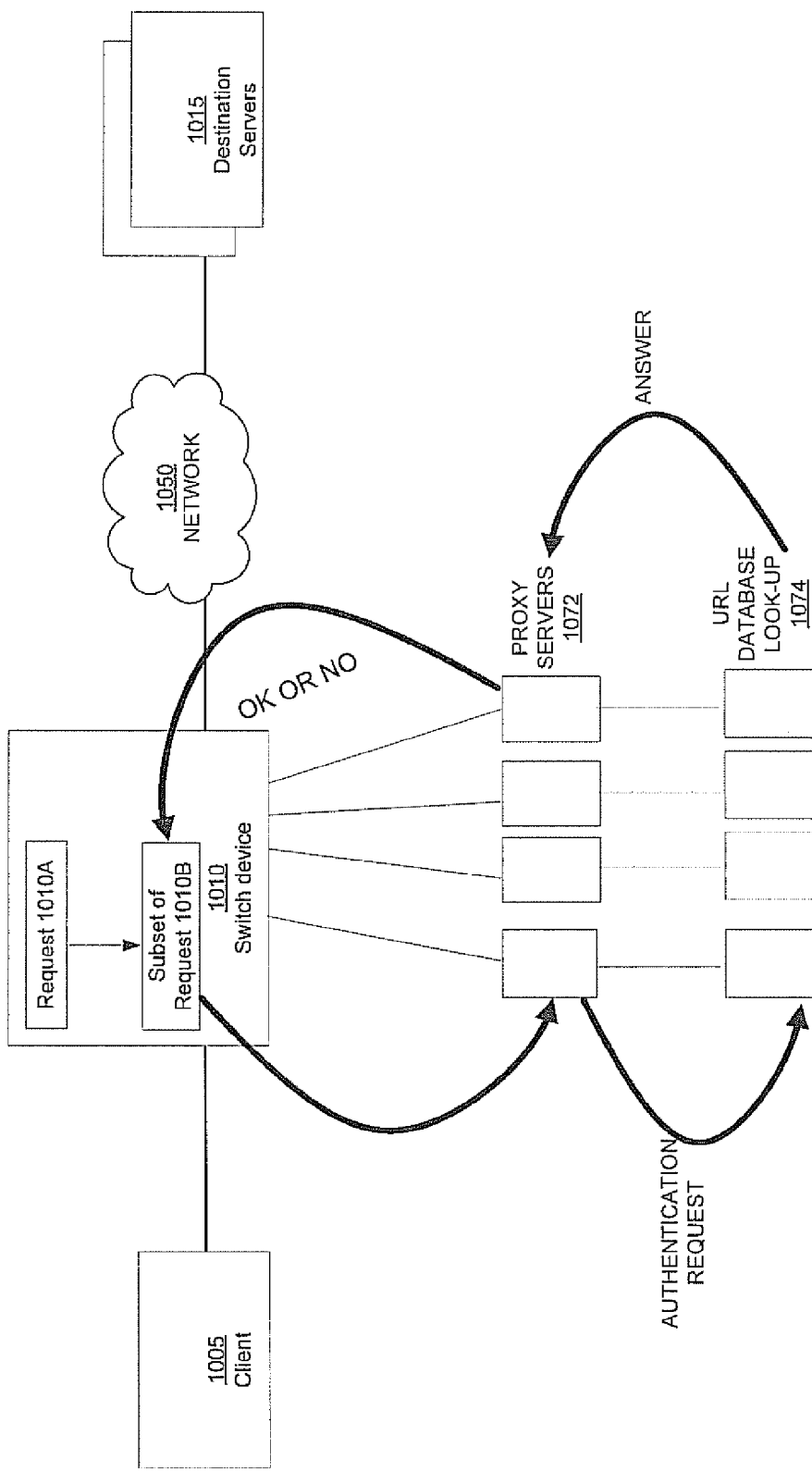
FIG. 10 is a diagram of a switch module engaged in handling HTTP requests from client devices in accordance with embodiments of the present invention.

FIG. 10 is a diagram of a switch module engaged in handling HTTP requests from client devices in accordance with embodiments of the present invention. The HTTP URL filtering service is optimized by configuring the gateway device 1010 in FIG. 10 with additional circuitry and functionality. The gateway device 1010 receives an HTTP request 1010 from client 1005, attempts to receive authentication from external device, e.g., proxy servers 1072, and if authentication is successful connects to destination servers 1015 via network 1050.

In one embodiment of the present invention, the gateway device, e.g., switch device 1010, can be configured to extract a set of HTTP headers and associated values 1010B from a client HTTP request in the format used by an external device, e.g. proxy servers 1072 for performing URL policy processing. Based on the configuration, which is typically user-determined, the gateway device will only forward the set of information extracted from the original client request in the format and order best fit for policy processing on external devices. This subset of the original request 1010B will typically include at least the URL of the destination server and the client IP address. The external device will use the subset of the request to send an authentication request to URL database 1074 and receive an answer back from the URL database look-up.

As discussed above, transmitting only a subset of the original request saves both the network bandwidth between the gateway device and policy processing external devices and also reduces the processing load on the external devices as noted above.

In one embodiment, switch device 1010 can be a device with additional load balancing functionalities, e.g., AX Series Server Load Balancers manufactured by A10 Networks. However, as stated above, switch device 1010 is not so limited and can be any other type of device as well. Switch device 1010 may also perform several other functions including Transparent Cache Switching ("TCS").

Figure 11:
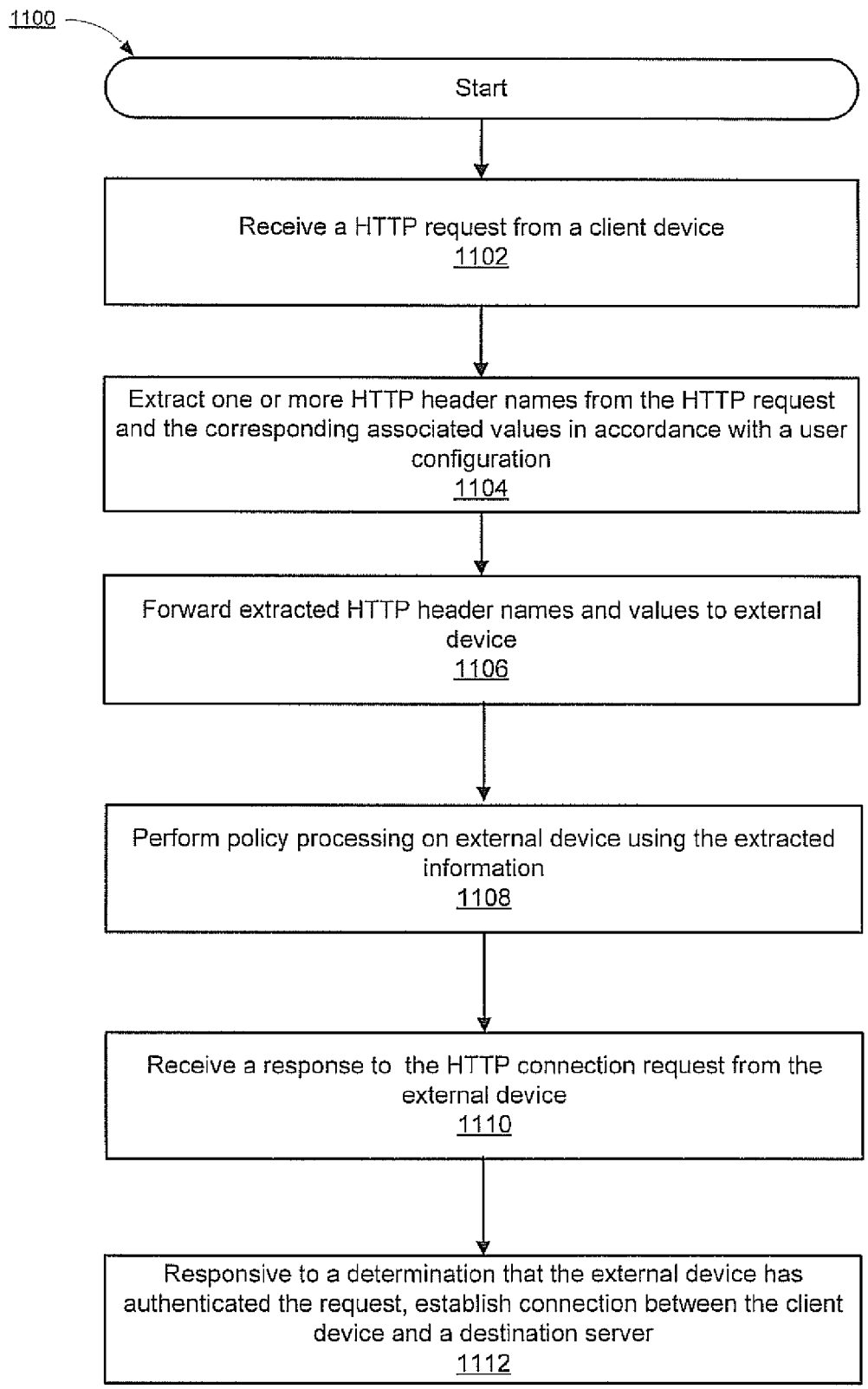
FIG. 11 depicts a flowchart for an exemplary computer controlled process for handling HTTP requests from client devices in accordance with embodiments of the present invention.

FIG. 11 depicts a flowchart for an exemplary computer controlled process for handling HTTP requests from client devices in accordance with embodiments of the present invention.

At step 1102, an HTTP client request is received by switch device 1010 from a client device 1005, which may occur through a user accessing a Web site by entering the URL of the website (http://www.mywebsite.com) into a web browser. A session is therefore established between the client machine 1005 and the switch device 1010.

At step 1104, the switch device 1010 extracts one or more HTTP header names from the HTTP request and the corresponding associated values in accordance with a user specified configuration as a subset of information from the original client request. For example, the HTTP header and value associated with the URL address of the destination server will be typically be extracted as well as the client IP and transmitted to the external device so that the URL address and client pair can be authenticated. Further, the HTTP headers and values are extracted and formatted in a way that is usable for the external device. If the external device needs the HTTP headers to be ordered in a certain way because it needs to read certain information before the other headers, then the switch device can be configured to accommodate an alternate ordering. The precise information extracted into the subset is programmable by the user.

In one embodiment, the switch device 1010 can add additional headers and values to the HTTP headers being forwarded to the external device that was not part of the original request. Of course, the additional headers added will need to be ones recognized by the external device. For example, in addition to the URL, the source IP may also be added in the form of an "X-Forwarded-For" HTTP header field. Typically the source IP address will be needed to authenticate the client. As is well-known, the X-Forwarded-For HTTP header field is a de facto standard for identifying the originating IP address of a client connecting to a web server through a switch device.

In one embodiment, additional options can be configured into the gateway device to control the load e.g. number of connections etc. on the external device. For example, configuration options for "conn-rate-limit," "conn-limit," and "request-rate-limit," can be programmed into the gateway device so it can determine how the load on the external devices should be controlled. The conn-rate-limit header defines how many connections the external device can accept in a given period of time. The conn-limit header defines how many total connections an external device is allowed to have. The request-rate-limit defines how many requests within a single connection can be made to the external device in a given period of time. These and other options can be used to control the traffic between the gateway device and the external devices, e.g., proxy servers to make sure the communication between the two devices is well maintained.

As compared to embodiments of the present invention, conventional gateway devices did not perform any Layer 7 HTTP parsing at all. Conventional gateway devices, for example, used Layer 4 TCS, which resulted in poor performance. Embodiments of the present invention, therefore, move the solution to optimizing HTTP URL service from Layer 4 to Layer 7. Because the switch device 1010 performs the Layer 7 proxy functions, the external device does not need to perform them. However, the external device will need to have some caching functionality to store the incoming requests and their corresponding authentication responses.

At step 1106, the HTTP headers are forwarded to the external device, e.g. proxy servers in accordance with the configuration specified in the switch device. In one embodiment, the gateway device uses "native" HTTP protocol to communicate with the external security device. In other embodiments, different protocols can be used to communicate with the external device. A session is, subsequently, initiated between the switch device 1010 and the external device 1072. The session entry in the session table for this session will have a link to the session entry for the original connection between the client device and the switch device, and vice versa. This allows the external device to correlate the authentication information it generates to the original connection established between the client device and the switch device. If the connection is authenticated then the original session is extended to the destination server so that the client and destination server can communicate with each other.

At step 1108, the external device performs policy processing. In other words, it analyses the HTTP headers transmitted to it from the switch device and determines the corresponding actions it needs to take in response. For example, among other things, the external device will typically authenticate the client's request using the destination server's URL by querying the URL database 1074 to locate a match with the client IP.

At step 1110, a response is received from the external device in response to the request from the client device.

At step 1112, if the request and a client, for instance, is allowed, a connection is established between the client device 1005 and destination servers 1015. If the request is not authenticated, then the client request is denied. In one embodiment of the present invention, the configuration policies the gateway device is programmed with can determine the corresponding actions to take based on the response from the policy processing. For example, if the connection is denied, the gateway device can be configured to transmit an error page to the user. Alternatively, it can be programmed to drop the request entirely.

FIG. 12 is an example of a client request that is typically transmitted to an external device for policy processing by a conventional gateway device. As shown in FIG. 12, a client request 1200 can include several headers and corresponding fields, not all of which are typically needed by an external security device for policy processing. For example, a typical client request can include, among others, the following headers: Host header 1202, User-Agent header 1204, Accept header 1206, Accept-Language header 1208, Accept-Encoding header 1210, and Cookie header 1212. As a result, embodiments of the present invention, filter out the necessary headers and format them in the gateway device before transmitting them to the external security devices, e.g., proxy servers. It should be noted that these headers are well-known in the art.

Figure 13A:
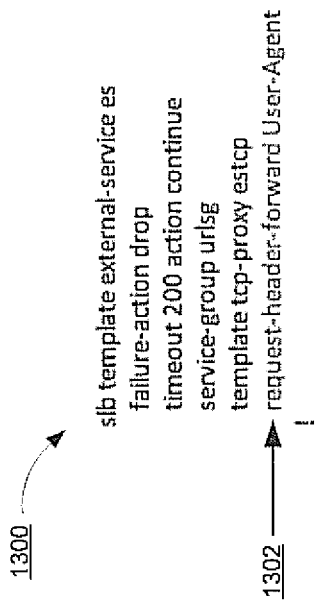
FIG. 13A is an example of an external service configuration which defines external service behavior in accordance with embodiments of the present invention.

FIG. 13A is an example of an external service configuration which defines external service behavior in accordance with embodiments of the present invention. FIG. 13A includes part of a configuration file 1300 executed on the switch device 1010. Configuration file 1300 will, for example, comprise commands indicating the header fields to be included in a transmission to the gateway device. For example, command 1302 indicates that the header "User-Agent" should be included in the set of headers transmitted to the external device. "User-Agent" will typically comprise information regarding the client device used to obtain authentication.

Figure 13B:
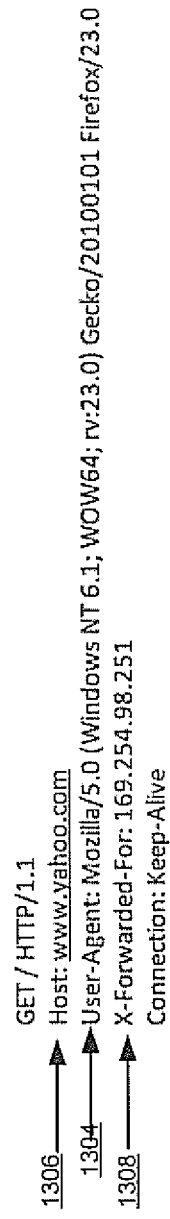
FIG. 13B is an example of an extracted set of HTTP headers and values transmitted from a gateway device to an external device in response to the external service configuration of FIG. 12A in accordance with embodiments of the present invention.

FIG. 13B is an example of an extracted set of HTTP headers and values transmitted from a gateway device to an external device in response to the external service configuration of FIG. 13A in accordance with embodiments of the present invention. As shown in FIG. 13B, the extracted set of HTTP headers and values 1350 include the User-Agent header 1304 in response to command 1302 in the configuration file. The User-Agent header can comprise information regarding attributes of the requesting client device 1005.

In one embodiment, the client IP address and the host header are included in the headers transmitted to the external device by default. The client IP address, as discussed above, is contained in the X-Forwarded-For header 1308 and the host address is contained in the Host header 1306. The Host header will typically be needed in all external service configurations so that the external security device can perform URL authentication.

Figures 14A, 14B:
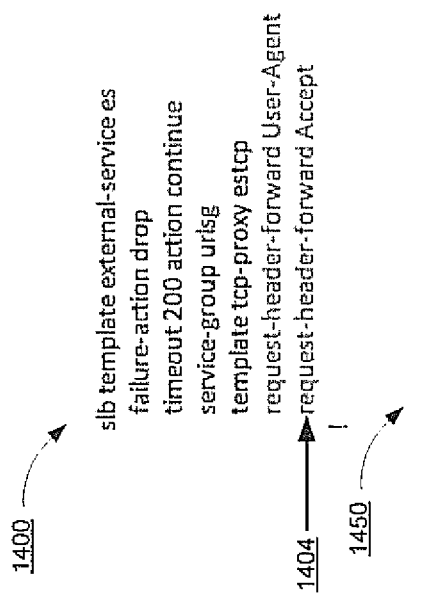
FIG. 14A is an example of an external service configuration which defines external service behavior in accordance with embodiments of the present invention.
FIG. 14B is an example of an extracted set of HTTP headers and values transmitted from a gateway device to an external device in response to the external service configuration of FIG. 13A in accordance with embodiments of the present invention.

FIG. 14A is another example of an external service configuration which defines external service behavior in accordance with embodiments of the present invention. FIG. 14A includes part of a configuration file 1400 executed on the switch device 1010. Configuration file 1400 will, for example, comprise commands indicating the header fields to be included in a transmission to the gateway device. For example, command 1404 indicates that the header "Accept" should be included in the set of headers transmitted to the external device. The Accept header contains information regarding the kind of response formats accepted by the client device.

FIG. 14B is an example of an extracted set of HTTP headers and values transmitted from a gateway device to an external device in response to the external service configuration of FIG. 14A in accordance with embodiments of the present invention. As shown in FIG. 14B, the extracted set of HTTP headers and values 1450 include the Accept header 1408 in response to command 1402 in the configuration file.

In one embodiment, the Cookie header, shown in FIG. 12, can also be included in a transmission to the external device. The Cookie header comprises information about the requesting session's attributes.

Figure 15:
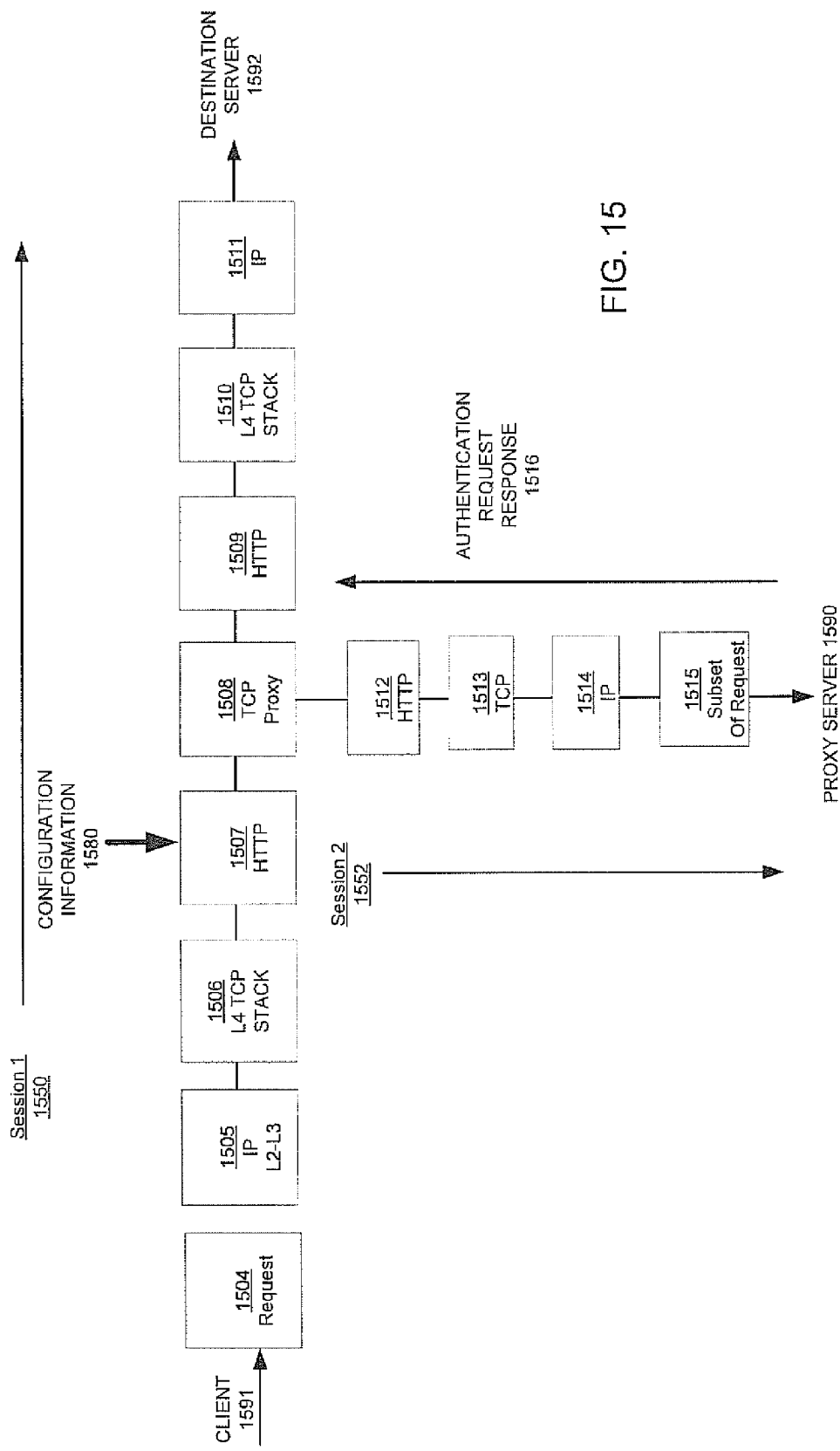
FIG. 15 is a block diagram illustrating the flow of information within a switch device in accordance with embodiments of the present invention.

FIG. 15 is a block diagram illustrating the flow of information within a switch device in accordance with embodiments of the present invention.

To establish Session 1 1550 with a destination server 1592, an incoming request 1504 from a client device 1591 received by a gateway device, e.g., switch device 1010 first goes through a Layer2 to Layer 3 module. Subsequently, it will pass through a Layer 4 TCP Stack module 1506. The gateway device comprises its own TCP stack within the TCP stack module 1506. The request then passes through a HTTP module 1507. HTTP module 1507, in one embodiment, performs the HTTP parsing of the incoming HTTP request from the client and determines how to forward the request to the external device, e.g., proxy server 1590. External service configuration information 1580, as illustrated in FIGS. 13A and 14A, feeds into the HTTP module to enable it to determine which set of HTTP headers should be extracted from the client request as the subset of information actually sent to the proxy servers, as discussed above.

As indicated above, embodiments of the present invention perform Layer 7 proxy functions using the TCP Proxy module 1508. The proxy module 1508 initiates the external session 1552 to connect to the external device, e.g., proxy servers through HTTP module 1512, Layer 4 TCP module 1513, and Layer 2 to Layer 3 IP module 1514. It then provides the subset of the original request 1515 to proxy server 1590. The external device 1590 responds with authentication confirmation or denial 1516 based on the subset of information 1515 provided. The TCP proxy module 1508 receives the response from the external device and if authentication confirmation is received and the external security device permits access to the destination server 1592, it establishes a link with the destination server through HTTP module 1509, Layer 4 TCP Stack module 1510, and Layer 2 to Layer 3 IP module 1511.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method of handling hyper-text transfer protocol ("HTTP") requests from client devices, said method comprising:
   receiving an HTTP request from a client device to connect to a destination server;
   extracting a plurality of HTTP headers from said HTTP request using a gateway device to create a subset;
   forwarding said subset to an external security device from said gateway device, said subset usable for policy processing using said request;
   based on a received result of said policy processing, transmitting said client request for receipt by destination server; and
   configuring said gateway device to control a number of connections with said external security device.

2. The method of claim 1, further comprising:
   receiving said result to said HTTP request from said external security device; and
   wherein said transmitting comprises:
   responsive to a determination that said external security device authenticated said HTTP request, establishing a connection between said client device and said destination server.

3. The method of claim 2, wherein said transmitting further comprises:
   responsive to a determination that said external security device denied said HTTP request, performing a responsive action, wherein said responsive action is selected from the group consisting of: a) dropping said HTTP request and b) transmitting an error message to said client device.

4. The method of claim 3, further comprising:
transmitting an authentication request from said external security device to a URL database and performing a URL database look-up to authenticate said HTTP request.

5. The method of claim 1, wherein said extracting is performed in accordance with a user defined configuration.

6. The method of claim 5, wherein said plurality of HTTP headers extracted and a format of extraction thereof are programmable by said user.

7. The method of claim 1, wherein said extracting comprises Layer 7HTTP parsing.

8. The method of claim 1, further comprising:
adding additional information to said plurality of HTTP headers prior to said forwarding.

9. The method of claim 8, wherein said additional information comprises an IP address of said client device.

10. The method of claim 8, wherein said additional information comprises a URL of said destination server.

11. The method of claim 1, further comprising:
formatting said plurality of HTTP headers using a format that is decodeable by said external security device prior to said forwarding.

12. The method of claim 1, wherein said gateway device is selected from a group consisting of: a switch and a load balancer.

13. The method of claim 1, wherein said external security device is selected from a group consisting of: transparent proxy server, non-transparent proxy server, and a proxy appliance.

14. A non-transitory computer-readable storage medium having stored thereon instructions that, if executed by a computer system cause the computer system to perform a method of handling hyper-text transfer protocol ("HTTP") requests from client devices, said method comprising:
receiving an HTTP request from a client device to connect to a destination server;
extracting a plurality of HTTP headers from said HTTP request using a gateway device in accordance with a user defined configuration to create a subset of said request;
forwarding said subset to an external security device from said gateway device said subset usable for policy processing using said request;
based on a received result of said policy processing, transmitting said client request for receipt by said destination server; and
configuring said gateway device to control a number of connections with said external security device.

15. The computer-readable medium as described in claim 14, further comprising:
receiving said result of said HTTP request from said external security device; and
wherein said transmitting comprises:
responsive to a determination that said external security device authenticated said HTTP request, establishing a connection between said client device and said destination server.

16. The computer-readable medium as described in claim 15, wherein said transmitting further comprises:
responsive to a determination that said external security device denied said HTTP request, using said gateway device to perform a responsive action, wherein said responsive action is selected from the group consisting of: a) dropping said HTTP request and b) transmitting an error message to said client device.

17. The computer-readable medium as described in claim 16, further comprising:
transmitting an authentication request from said external security device to a URL database and performing a URL database look-up to authenticate said HTTP request.

18. The computer-readable medium as described in claim 14, wherein said extracting is performed in accordance with a user defined configuration.

19. The computer-readable medium as described in claim 18, wherein said plurality of HTTP headers extracted and a format of extraction thereof are programmable by said user.

20. The computer-readable medium as described in claim 18, wherein said extracting comprises Layer 7 HTTP parsing.

21. The computer-readable medium as described in claim 14, further comprising:
adding additional information to said plurality of HTTP headers prior to said forwarding.

22. The computer-readable medium as described in claim 21, wherein said additional information comprises an IP address of said client device.

23. The computer-readable medium as described in claim 21, wherein said additional information comprises a URL of said destination server.

24. The computer-readable medium as described in claim 14, wherein said gateway device is selected from a group consisting of: a switch and a load balancer.

25. The computer-readable medium as described in claim 14, wherein said external security device is selected from a group consisting of: transparent proxy server, non-transparent proxy server, and a proxy appliance.

26. An apparatus for handling hyper-text transfer protocol ("HTTP") requests from client devices, said apparatus comprising:
a memory;
a processor communicatively coupled to said memory, wherein said processor is configured to parse HTTP requests, and further wherein said processor is configured to:
receive an HTTP request from a client device to connect to a destination server;
extract a plurality of HTTP headers from said HTTP request using a gateway device to create a subset;
forward said subset to an external security device from said gateway device said subset usable for policy processing using said request; and
based on a received result of said policy processing, transmit said client request for receipt by said destination server; wherein said gateway device is configured to control the number of incoming HTTP requests to a connected external security device to reduce a processing load on said external security device.

* * * * *